US008588623B2

(12) United States Patent
Djordjevic et al.

(10) Patent No.: US 8,588,623 B2
(45) Date of Patent: Nov. 19, 2013

(54) CODED POLARIZATION-MULTIPLEXED ITERATIVE POLAR MODULATION

(75) Inventors: Ivan B. Djordjevic, Tucson, AZ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 315 days.

(21) Appl. No.: 12/860,659

(22) Filed: Aug. 20, 2010

(65) Prior Publication Data

US 2011/0085624 A1    Apr. 14, 2011

Related U.S. Application Data

(60) Provisional application No. 61/250,731, filed on Oct. 12, 2009.

(51) Int. Cl.
    *H04B 10/06*    (2011.01)

(52) U.S. Cl.
    USPC ............................................. 398/202; 398/208

(58) Field of Classification Search
    USPC ......... 398/202, 203, 204, 205, 206, 208, 209, 398/212, 213, 214; 375/316, 324, 325, 340, 375/341
    See application file for complete search history.

(56) References Cited

U.S. PATENT DOCUMENTS

| | | | |
|---|---|---|---|
| 8,175,466 B2 * | 5/2012 | Djordjevic et al. | 398/202 |
| 8,184,993 B2 * | 5/2012 | Djordjevic et al. | 398/205 |
| 2009/0297144 A1 * | 12/2009 | Djordevic et al. | 398/39 |

OTHER PUBLICATIONS

Ivan B. Djordjevie et al. ("Next Generation FEC for High-Capacity Communication in Optical Transport Networks", Journal Of Lightwave Technology, vol. 27, No. 16, Aug. 15, 2009).*
Djordjevic, I.B., et al., "Next Generation FEC for High-Capacity Communication in Optical Transport Networks", Journal of Lightwave Technology, vol. 27, No. 16, Aug. 15, 2009, pp. 3518-3530.
Essiambre, R.J. et al., "Capacity Limits of Information Transport in Fiber-Optic Networks", The American Physical Society, Oct. 17, 2008, pp. 163901-1-163901-4.
Hu, X.Y. et al., "Efficient Implementations of the Sum-Product Algorithm for Decoding LDPC Codes", Global Telecommunications Conference—GLOBECOM, 2001, pp. 1036-1036E.
Peric, Z.H. et al., "Design of Signal Constellations for Gaussian Channel by Using Iterative Polar Quantization", Electrotechnical Conference, 1998 MELECON 98., 9th Mediterranean, vol. 2, May 18-20, 1998 pp. 866-869 vol. 2 Digital Object Identifier 10.1109/MELCON.1998.699649.
Webb, W.T. et al., "Variable Rate QAM for Mobile Radio", IEEE Transactions on Communications, vol. 43, No. 7, Jul. 1995, pp. 2223-2230.

* cited by examiner

*Primary Examiner* — M. R. Sedighian
(74) *Attorney, Agent, or Firm* — Joseph Kolodka

(57) ABSTRACT

Systems and methods for optical communication that use a transmitter/receiver. The systems and methods include receiving a modulated, encoded input stream. Channel memory is reduced using coarse digital backpropagation and other channel impairments are removed using turbo equalization. Symbols are detected in the input stream that conform to a non-uniform, polar constellation having a Gaussian source distribution to produce a stream of encoded data. The stream of encoded data is decoded with one or more low density parity check (LDPC) decoders.

12 Claims, 6 Drawing Sheets

CODED POLARIZATION-MULTIPLEXED ITERATIVE POLAR MODULATION

RELATED APPLICATION INFORMATION

This application claims priority to the provisional application having Ser. No. 61/250,731 that was filed on Oct. 12, 2009, which is incorporated herein by reference.

BACKGROUND

1. Technical Field

The present invention relates to modulation schemes and, in particular, to systems and methods for low density parity check (LDPC) coded, polarization-multiplexed, iterative polar modulation.

2. Description of the Related Art

In the recent years, with the rapid growth of data-centric services and the general deployment of broadband access networks, the dense wavelength division multiplexing (DWDM) network has been upgraded from 10 Gb/s per channel to more spectrally-efficient 40 Gb/s or 100 Gb/s per channel systems and beyond. 100 Gb/s Ethernet (100 GbE) is currently under standardization for both local area networks (LANs) and wide area networks (WANs). As the communication rate over a given medium increases, transmissions become increasingly sensitive to errors—the difference between one symbol and the next is very small, and a small amount of noise can cause incorrect reception. The Shannon limit for a noise-influenced channel describes a maximum amount of error-free data that can be transmitted with a specified bandwidth—it is therefore helpful to have robust codes and modulation schemes that closely approach the Shannon limit without imposing high requirements in terms of implementation cost and complexity.

SUMMARY

A method for receiving is shown that includes receiving a modulated, encoded input stream, reducing channel memory in the input stream using coarse digital backpropagation, and removing channel impairments from the input stream using turbo equalization. Symbols are detected in the input stream that conform to a non-uniform, polar constellation having a Gaussian source distribution to produce a stream of encoded data. The stream is decoded with one or more low density parity check (LDPC) decoders.

A method for transmitting is shown that includes encoding one or more streams of input data with one or more low density parity check encoders to produce one or more encoded data streams. The encoded data streams are then mapped to symbols that conform to a non-uniform, polar constellation having a Gaussian source distribution. The symbols are modulated onto an optical carrier beam.

A receiver is shown that includes one or more detectors, each configured to extract symbols that conform to a non-uniform, polar constellation having a Gaussian source distribution from a carrier beam and to output a coded stream. One or more log likelihood ratio (LLR) modules configured to generate LLR information for the respective coded streams, and further include a lookup table configured to store correspondences between bit sequences and the symbols. The coded stream is decoded by one or more decoder, each configured to accept a coded stream and the associated LLR information and to produce a decoded data stream.

A transmitter, is shown that includes one or more low density parity check (LDPC) encoders, each configured to encode one or more streams of input data to produce one or more encoded data streams. The encoded data streams are mapped by a mapper to symbols that conform to a non-uniform, polar constellation derived from a Gaussian source distribution. The transmitter further includes a modulator that is configured to modulate the symbols onto a first optical carrier beam.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
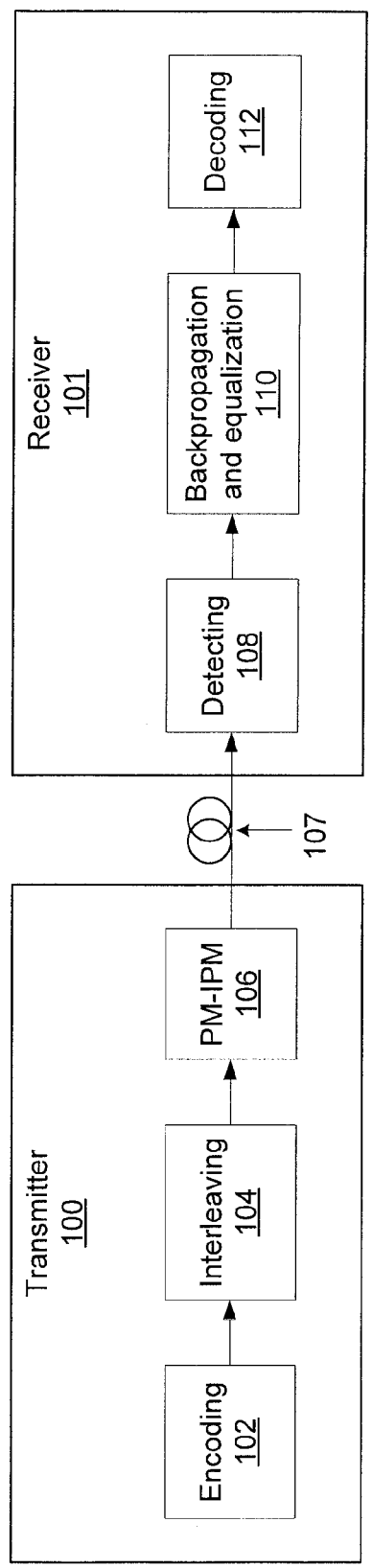
FIG. 1 shows a block diagram illustrating a polarization multiplexed, iterative polarization modulation (PM-IPM) transmission system.

Every communications channel has a channel capacity, defined as the maximum information rate that the communication channel can carry within a given bandwidth. A coded polarization-multiplexed iterative polarization modulation (PM-IPM) scheme based on iterative polar quantization closely achieves the channel capacity in both thermal noise and amplified spontaneous emission (ASE) noise dominated scenarios. This channel capacity achieving signal constellation is derived by minimizing the quantization mean squared error (QMSE) of an information source. Quasi-cyclic, low density parity check (LDPC) codes are used for forward error correction (FEC), due to their channel capacity achieving performance and low complexity of encoders and decoders compared to random codes, but it is contemplated that other codes may be used. LDPC codes employ iterative belief propagation techniques that enable decoding in time that is proportional to their block length.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an optical communications system is shown comprising a transmitter 100 and a receiver 101. The transmitter encodes a plurality of data signals at the encoder block 102 and then interleaves those signals at interleaving block 104. The mapping block 106 then assigns bits of the interleaved signal to an iterative polarization modulation constellation, associating the bits of the interleaved data signals with the points on an IPM constellation. The transmitter 100 then sends the signal to receiver 101 over an optical medium 107, which may include periodically deployed erbium doped fiber (EDF) amplifiers to maintain the signal strength. Other embodiments include the use of Raman and hybrid Raman/EDF amplifiers. Receiver 101 detects symbols in the IPM constellation at block 108. A backpropagation and equalization block 110 performs coarse digital backpropagation and turbo equalization to compensate for channel impairments such as polarization mode dispersion, chromatic dispersion, and fiber non-linearities. The signals are then de-interleaved and decoded at block 112 to produce the original data signals.

It is contemplated that codes other than LDPC may be used. However, LDPC codes closely approach channel capacity and can provide superior performance. Longer LDPC codes with larger girth (≥10) tend to improve performance, but the relation between the code length and performance is not linear, and there is a bottleneck where increasing LDPC codes even to an impractical length will not improve the performance of the system in a noticeable manner. In such a case of diminishing returns, the present modulation scheme helps to bring transmissions closer to the channel capacity, while using LDPC codes advantageously having a girth of at least 8.

LDPC coded modulation, combined with coherent detection and multilevel turbo equalization can help mitigate various signal impairments such as inter- and intra-channel non-linearities, polarization mode dispersion (PMD) and residual chromatic dispersion. The complexity of this scheme, however, grows exponentially as the channel memory increases and adjacent symbols begin to interfere with one another. Another method for a nonlinear equalization is based on backpropagation. This method, however, also suffers from high complexity and does not account for the nonlinear ASE noise-Kerr nonlinearities interaction. As such, the equalization/backpropagation module 110 uses coarse receiver digital backpropagation (with a reasonable, small number of coefficients) to reduce the channel memory, and compensate for remaining channel distortions by a turbo equalization scheme. The number of coefficients used depends on the type of platform used, but can be, for example, up to ten. Channel memory effects refer to the influence that neighboring symbols can have on an observed symbol, producing what is commonly referred to as inter-symbol interference.

IPM constellations are determined based on the minimum quantization mean squared error (QMSE). The optimum source distribution for Gaussian channels, such as ASE noise-dominated channels, is Gaussian. The in-phase $s_I$ and quadrature $s_Q$, components of Gaussian random constellation vector $s=(s_I, s_Q)$ follow a 2-D distribution with zero mean. Corresponding polar coordinates of this signal constellation are given by:

$$s = |s|e^{i\theta}, |s| = \sqrt{s_I^2 + s_Q^2}, \theta = \tan^{-1}\frac{s_Q}{s_I},$$

with the distribution of envelope |s| being Rayleigh and the distribution of θ being uniform.

For a Gaussian source, the distribution of ring radii is selected to be Rayleigh and the signal constellation is obtained by quantizing the source while minimizing QMSE. This is achieved using restricted iterative polarization quantization (IPQ) that includes a non-uniform scalar quantization of the amplitude and a uniform scalar quantization of the phase. The number of points on each ring is selected iteratively for all the concentric rings.

Let $L_i$ denote the number of constellation points per circle of radius $m_i$. The optimum number of constellation points per $i^{th}$ circle is determined by minimizing the QMSE by:

$$L_i = \sqrt[3]{m_i^2 \int_{r_i}^{r_{i+1}} p(r)\,dr} \bigg/ \left[\sum_{i=2}^{L_r} \frac{1}{L} \sqrt[3]{m_i^2 \int_{r_i}^{r_{i+1}} p(r)\,dr}\right]; \quad (1)$$

$$i = 1, 2, \ldots, L_r$$

where $L_r$ is the number of circles in the constellation, L is the total number of signal constellation points ($L=\Sigma_{i=2}^{L_r} L_i$ and p(r) is Rayleigh distribution function for probability $$p(r) = \frac{r}{\sigma^2} e^{-\frac{r^2}{2\sigma^2}}, \text{ for } r \geq 0,$$

where $\sigma^2$ represents the source power.

The radius of the $i^{th}$ ring is determined as:

$$m_i = 2\sin(\Delta\theta_i/2) \int_{r_i}^{r_{i+1}} rp(r)\,dr / \Delta\theta_i \int_{r_i}^{r_{i+1}} p(r)\,dr, \quad (2)$$

$$\Delta\theta_i = \frac{2\pi}{L_i}, i = 1, 2, \ldots, L_r.$$

The limits of integration in equations (1) and (2) are determined by:

$$r_i = \pi(m_i^2 - m_{i-1}^2)/2[m_iL_i \sin(\Delta\theta_i/2) - m_{i-1}L_{i-1}\sin(\Delta\theta_i/2)],$$
$$i=1,2,\ldots,L_r \quad (3)$$

The Rayleigh distribution is used because the envelope r of a two-dimensional (zero-mean) Gaussian distribution with coordinates $r_I$ and $r_Q$ (representing in-phase and quadrature components), determined by $r=\sqrt{r_I^2 r_Q^2}$, conforms to a Rayleigh probability distribution.

As the iterative process proceeds, applying equations (1)-(3) until convergence, the number of rings, the radius of each ring, and the number of points on each ring are determined and stored. As discussed above, the phase distribution is uniform. In Table 1 and 2, optimum IPM coordinates obtained by such an iterative procedure are listed for M=16 and M=64 respectively.

TABLE 1

| | \multicolumn{2}{c}{M = 16} |
|---|---|---|
| | \multicolumn{2}{c}{Circle index, $L_r$} |
| | 1 | 2 |
| Decision boundaries $r_i$ | 0 | 1.277468 |
| Circle radius $m_i$ | 0.746323 | 1.817866 |
| Number of points in $L_r^{th}$ circle, $L_i$ | 6 | 10 |

TABLE 2

| | \multicolumn{5}{c}{M = 64} |
|---|---|---|---|---|---|
| Circle index, $L_r$ | 1 | 2 | 3 | 4 | 5 |
| Decision boundaries $r_i$ | 0 | 0.543885 | 1.01908 | 1.549403 | 2.245731 |
| Circle radius $m_i$ | 0.334166 | 0.780397 | 1.263456 | 1.834891 | 2.613542 |
| Number of points in $L_r^{th}$ circle, $L_i$ | 5 | 11 | 15 | 17 | 16 |

Figure 2:
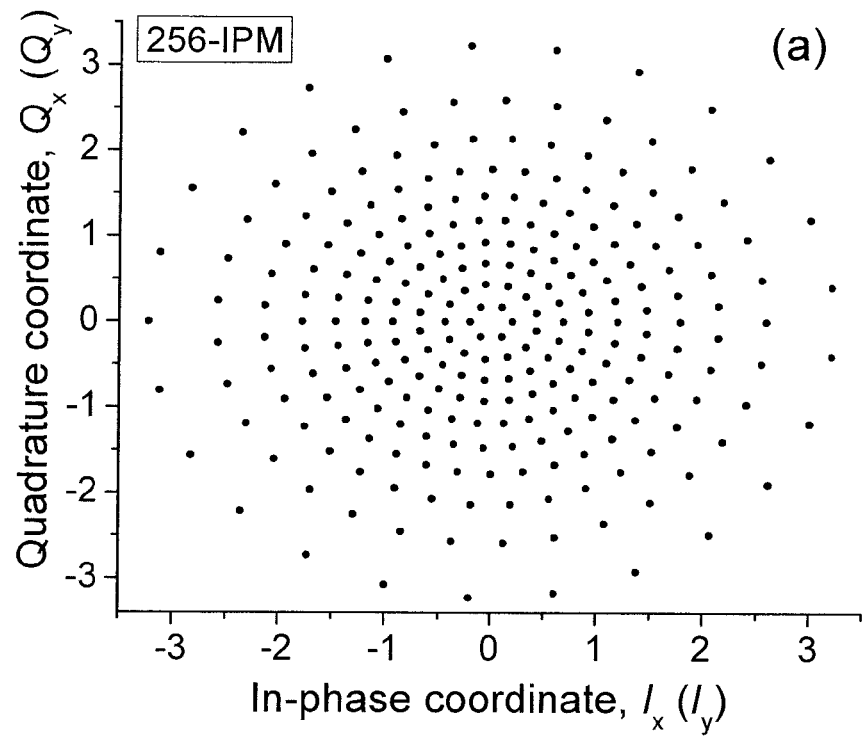
FIG. 2 shows a 256-IPM constellation.
Figure 3:
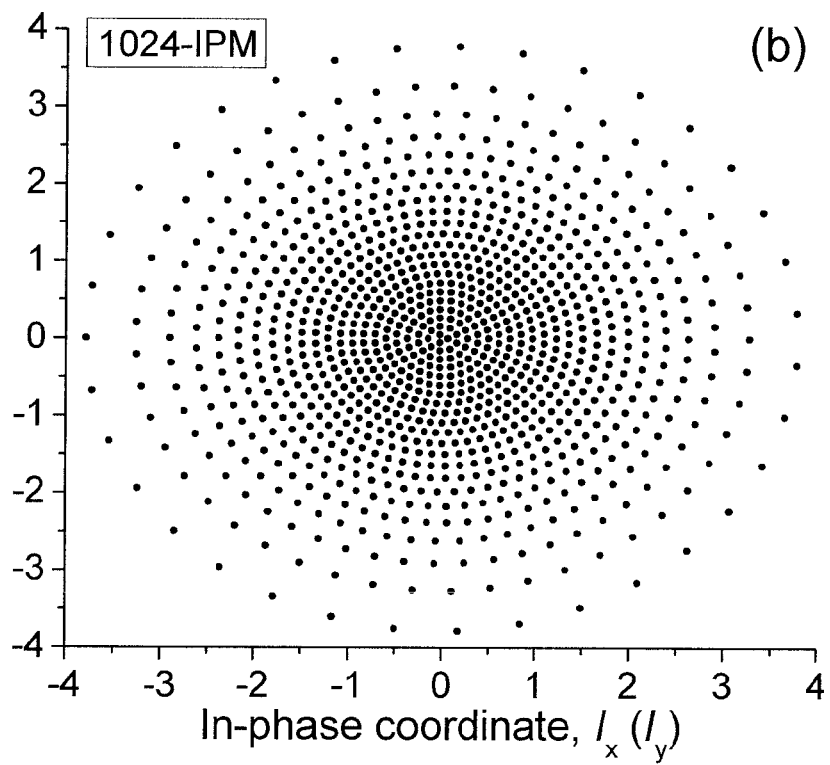
FIG. 3 shows a 1024-IPM constellation.

Referring now to FIGS. 2 and 3, constellations are shown that correspond to M=256 and M=1024 respectively. Each point shown in FIGS. 2 and 3 is assigned a symbol, comprising an amplitude along each axis, that represents a sequence of data bits. In FIG. 2, M=256 produces symbols that are eight bits long, whereas the M=1024 constellation in FIG. 3 produces symbols that are ten bits long. By transmitting an in-phase (I) and a quadrature (Q) signal, the position on the X and the Y axis of the constellation can be accurately determined, allowing a receiver to demap the symbol. An IPM constellation may reach the channel capacity for low and medium signal-to-noise ratios and significantly outperform the square quadrature amplitude modulation (QAM) and star QAM constellations.

The IPM constellations benefit from a non-uniform distribution, where the points in outer rings are spaced farther apart than the inner rings. This non-uniform distribution provides a better fit to an optimum Gaussian source distribution than a uniform distribution would because it provides superior compensation for the drift in I and Q values that noise introduces. The correspondence between bit sequences and constellation positions may be stored and retrieved from a stored lookup table. The lookup tables are generated in advance by the techniques described above and are included in both the transmitter 100 and the receiver 101.

It is clear from FIGS. 2 and 3 that the distribution of points is non-uniform and forms a 2-D Gaussian distribution with zero mean. Toward the edges of the constellation, the density is minimal. Therefore, the distance between constellation points farther from the center is higher. Moving toward the center of the constellation, the density of constellation points increases until reaching its peak at the innermost ring. This distribution of points reflects the noise distribution in thermal- and ASE-dominated noise scenarios.

Figure 4:
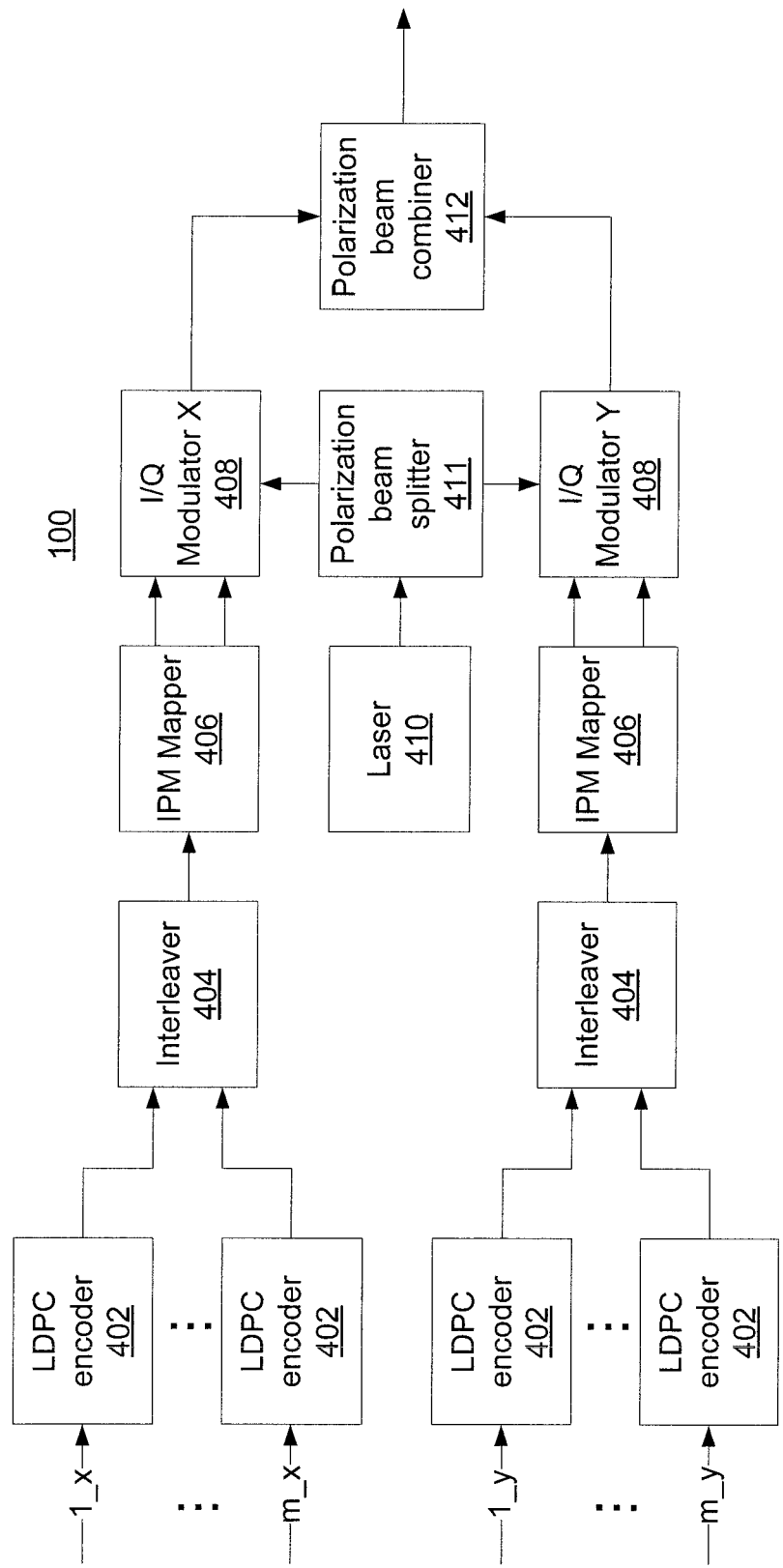
FIG. 4 shows a block diagram illustrating a PM-IPM transmitter.

Referring now to FIG. 4, a detailed view of the transmitter 100 is shown. 2m data signals feed into the transmitter. The data signals are divided into m signals to be put on an x polarization and m signals for a y polarization. FIG. 4 illustrates two separate branches, one for each of the respective polarization, and m signals for each branch. Although the branches are described herein as having equal numbers of input data signals, the branches may also accept different numbers of inputs. The data streams are encoded at LDPC encoders 402 using different LDPC codes having code rates $R_i = K_i/N$ ($i \in \{x,y\}$), where $K_i$ denotes the number of information symbols used in the binary LDPC code corresponding to each polarization and N denotes the codeword length, where both LDPC codes have the same codeword length. An exemplary code rate for use with the present principles is 6922/8547.

The 2m input bit streams from 2m different information sources pass through identical LDPC encoders 402 that use large-girth quasi cyclic LDPC codes $R_i$. The outputs of the encoders are then bit-interleaved by an m×n bit-interleaver 404, where the sequences are written row-wise and read column-wise. The output of the interleaver 404 is sent in one bit-stream, m bits at a time instant i, to a mapper 406.

The mappers 406 map each m bits into a $2^m$-ary IPM signal constellation point based on a lookup table, as explained above. The mapper 406 constellation point assigns constellation points $s_i=(I_i,Q_i)=|S_i|\exp(j\phi_i)$, with the mapped coordinates from the mapper 406 being used as the inputs of an I/Q modulators 408. A laser 410 produces a carrier beam that is split at polarization beam splitter 411 into two orthogonal polarizations. The I/Q modulators 408 modulate the constellation points onto the orthogonally polarized carrier beams. The beams from the respective branches of the transmitter 100 are then combined in beam combiner 412 before being transmitted on an optical fiber. Because the combined beams occupy polarizations that are orthogonal with respect to one another, they can be combined without loss of information.

Figure 5:
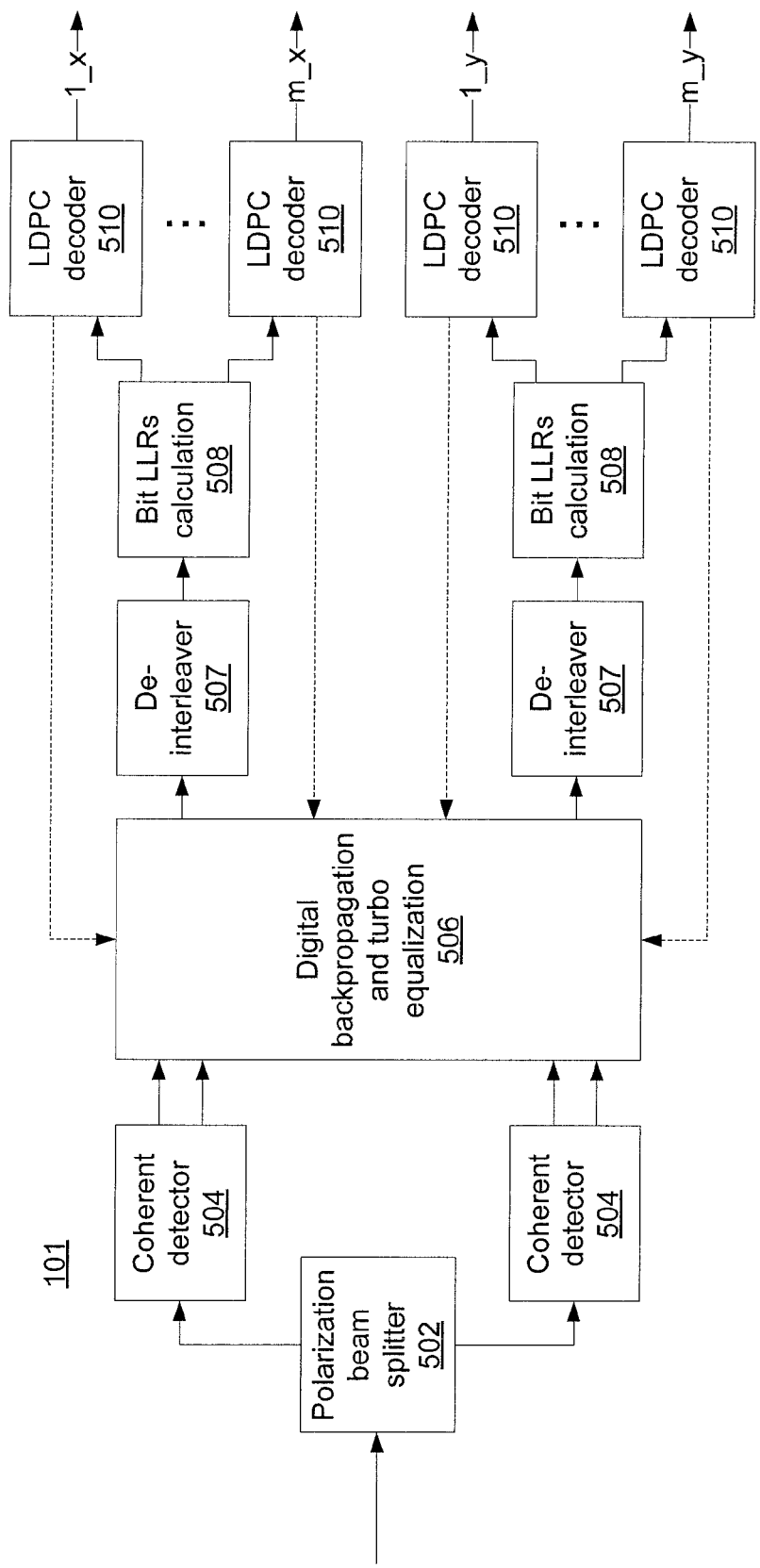
FIG. 5 shows a block diagram illustrating a PM-IPM receiver.

Referring now to FIG. 5, a detailed view of the receiver 101 is shown. A carrier beam is received from an optical fiber and is split at beam splitter 502 into two orthogonal polarizations. Detectors 504 demodulate the beams to produce I and a Q signal estimates by sampling their respective signals. Although detectors 504 are advantageously implemented as coherent detectors, it is contemplated that other sorts of detector might be used. In embodiments that employ coherent detection, a local laser source (not shown) is used to provide the detectors 504 with a local reference that allows them to quickly distinguish between the orthogonal polarizations and extract the information.

The I and Q signals produced by the detectors 504 then pass to the digital backpropagation and turbo equalization module 506, where various channel impairments are corrected. The data stream is de-interleaved at de-interleaver 507 and then passed to bit log likelihood ratio (LLR) modules 508. The bit LLR modules 508 determine the bit LLRs from symbol LLRs. The bit LLR modules 508 include a lookup table that stores the same constellation information as the lookup table at the transmitter, allowing the bit LLR modules 508 to convert symbols to bit sequences. The symbol LLRs are defined as $\lambda(s)=\log [P(s|r)/P(s_0|r)]$, where $s=(I_i,Q_i)$ and $r=(r_I,r_Q)$ denote the transmitted signal constellation point and received symbol at time instance i respectively, and $s_0$ represents the referent symbol are determined in block 506.

The bit LLR modules 508 each produce m bit LLRs which are processed by m LDPC decoders 510. The bit reliabilities for LDPC decoders 510 are calculated from symbol reliabilities. To improve bit error rate (BER) performance, EXIT chart analysis is used and extrinsic reliabilities are iterated between maximum a posteriori (MAP) equalizer and LDPC decoders 510 in turbo equalization fashion until convergence or until a predetermined number of iterations has been reached. The MAP equalizers form a part of the turbo equalizer in block 506. One advantageous embodiment of a MAP equalizer uses the Bahl-Cocke-Jelinek-Raviv (BCJR) algorithm. The LDPC decoders 510 then produce the original 2m data signals as output and feed back extrinsic LLR information to the turbo equalizers in block 506.

Figure 6:
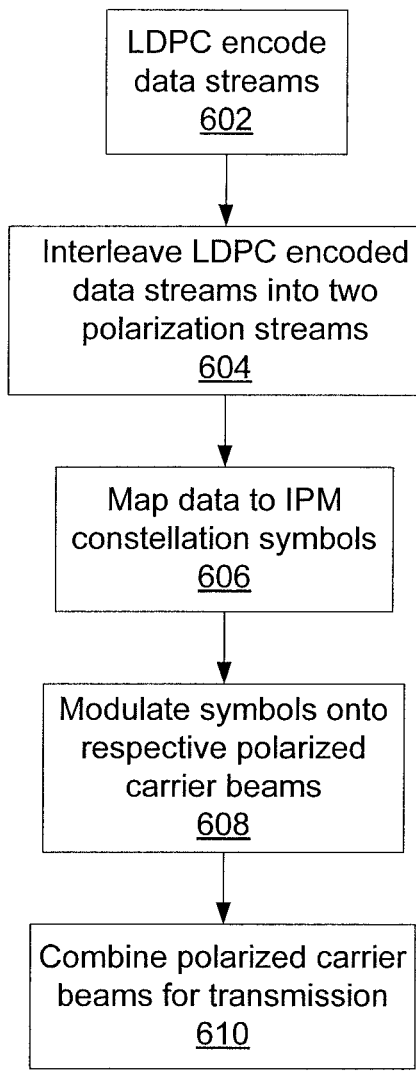
FIG. 6 shows a block/flow diagram illustrating a system/method for transmitting data using PM-IPM.

Referring now to FIG. 6, a system/method for encoding and modulating data for transmission using PM-IPM is shown. These modulation methods provide for very high transmission rates, in excess of 400 Gb/s, over long distances. A plurality of data streams are encoded at block 602 using a structured LDPC code. The encoded streams are then interleaved at block 604 into two separate polarization streams, representing the two orthogonal polarizations that are to be multiplexed. The interleaved streams can then be mapped to the symbols of an IPM constellation, such as those described above, at block 606, providing in-phase and quadrature values that identify particular symbols. The I and Q values for each set of symbols are used to modulate the symbols onto orthogonally polarized carrier beams via phase modulation at block 608 before those polarized carrier beams are combined into a single beam for transmission at block 610. The combined carrier beam can then be transmitted over an optical fiber to its destination.

Figure 7:
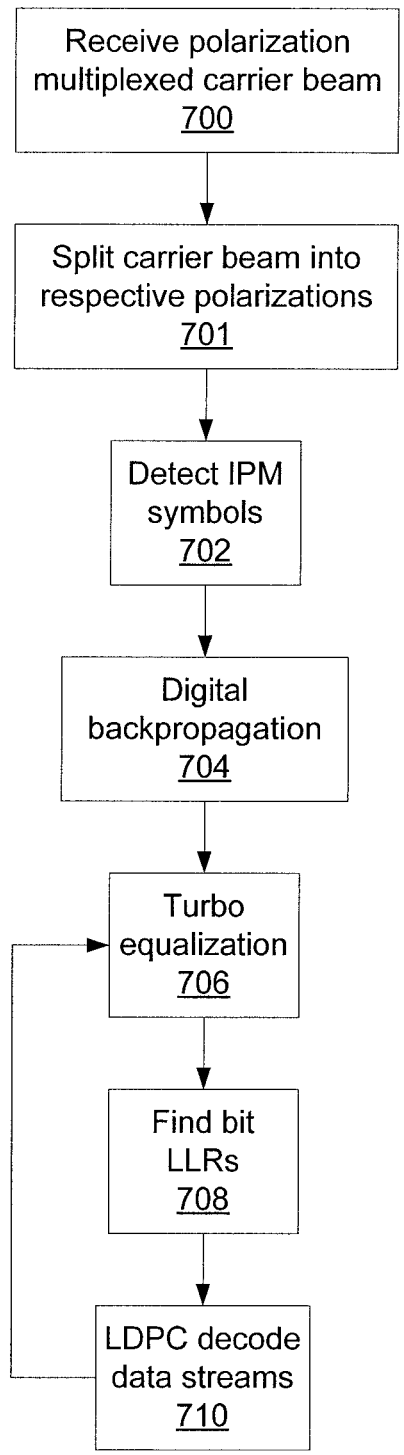
FIG. 7 shows a block/flow diagram illustrating a system/method for receiving and decoding data using PM-IPM.

Referring now to FIG. 7, a system/method for receiving and decoding PM-IPM data is shown. The combined carrier beam is received from an optical transmission fiber at block 700 and is then split into two orthogonal polarizations at block 701. The IPM symbols are then detected and extracted from the carrier beams at block 702. It is contemplated that any method of detection could be used, but for the purpose of example and discussion coherent detection is used herein. Channel memory is reduced through coarse digital back-propagation at block 704, and remaining channel distortions are compensated for using turbo equalization in block 706. The symbols are converted to bit streams and the bit LLRs for the streams are calculated at block 708. These bit LLRs are used to decode the LDPC encoded data at block 710. At block 712, extrinsic LLR information is passed back from the LDPC decoding to be used in subsequent turbo equalizations.

Employing the above-described systems and methods, optical communications can be conducted with substantially longer transmission distances and higher transmission rates along existing optical fiber connections. Embodiments of the present principles have been shown to provide data rates of 400 Gb/s over distances as large as 2250 km using the exemplary systems and methods described above. By using a dispersion map composed of single-mode fiber sections only, it can be shown that PM-IPM achieves a channel capacity of 5.16 bits/s/Hz per single polarization at a transmission distance of 2000 km—performance that exceeds existing forms of modulation. Furthermore, higher speeds can be achieved in transmissions across shorter distances.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for receiving, comprising:
    receiving a modulated, encoded input stream;
    reducing channel memory using coarse digital backpropagation;
    removing channel impairments using turbo equalization;
    detecting symbols in the input stream that conform to a non-uniform, polar constellation having a Gaussian source distribution to produce a stream of encoded data; and
    decoding the stream of encoded data with one or more low density parity check (LDPC) decoders.

2. The method of claim 1, wherein the constellation is an iterative polar modulation (IPM) constellation.

3. The method of claim 1, wherein the input stream is decoded with a large-girth, high-rate, quasi-cyclic LDPC code.

4. The method of claim 1, wherein said decoding includes iterating extrinsic LLRs between a maximum a posteriori (MAP) equalizer and one or more LDPC decoders until convergence or until predetermined number of iterations has been reached.

5. The method of claim 1, further comprising:
    receiving an optical carrier beam; and
    splitting the optical carrier beam into two orthogonal polarizations, each having a modulated, encoded input stream.

6. The method of claim 1, wherein points of the constellation are determined by iteratively applying $$L_i = \sqrt[3]{m_i^2 \int_{r_i}^{r_{i+1}} p(r)\,dr} \bigg/ \left[ \sum_{i=2}^{L_r} \frac{1}{L} \sqrt[3]{m_i^2 \int_{r_i}^{r_{i+1}} p(r)\,dr} \right];$$

$$i = 1, 2, \ldots, L_r$$

and $$m_i = 2\sin(\Delta\theta_i/2) \int_{r_i}^{r_{i+1}} rp(r)\,dr \bigg/ \Delta\theta_i \int_{r_i}^{r_{i+1}} p(r)\,dr,$$

$$\Delta\theta_i = \frac{2\pi}{L_i}, i = 1, 2, \ldots, L_r,$$

where $L_i$ number of constellation points in the $i^{th}$ circle, $m_i$ is the radius of the $i^{th}$ circle, L is the total number of constellation points, p(r) is the Rayleigh distribution function, and the limits of integration $r_i$ are determined by $r_i = \pi(m_i^2 - m_{i-1}^2)/2 [m_i L_i \sin(\Delta\theta_i/2) - m_{i-1}L_{i-1}\sin(\Delta\theta_i/2)]$, i=1, 2, . . . , $L_r$.

7. A receiver, comprising:

one or more detectors, each configured to extract symbols that conform to a non-uniform, polar constellation having a Gaussian source distribution from a carrier beam and to output a coded stream;

one or more log likelihood ratio (LLR) modules configured to generate LLR information for the respective coded streams, comprising a lookup table configured to store correspondences between bit sequences and the symbols; and one or more decoder, each configured to accept a coded stream and the associated LLR information and to produce a decoded data stream;

a digital backpropagation module configured to reduce channel memory; and a turbo equalization module configured to compensate for channel impairments.

8. The receiver of claim 7, wherein the digital backpropagation module is configured to use coarse backpropagation.

9. The receiver of claim 7, comprising:

a beam splitter configured to accept a transmission carrier beam and split the transmission carrier beam into two orthogonally polarized carrier beams;

two detectors configured to receive the respective polarized carrier beams and to output IPM signals.

10. The receiver of claim 7, wherein the decoders are large-girth, high-rate, quasi-cyclic LDPC decoders.

11. The receiver of claim 7, wherein the number of decoders is equivalent to twice the number of bits represented by each IPM symbol.

12. The receiver of claim 7, wherein each orthogonally polarized carrier beam has an associated number of decoders and the numbers of decoders associated with the respective orthogonally polarized carrier beams are different.

* * * * *